US011102419B2

United States Patent
Sakurabu et al.

(10) Patent No.: US 11,102,419 B2
(45) Date of Patent: Aug. 24, 2021

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Hitoshi Sakurabu, Saitama (JP); Makoto Kobayashi, Saitama (JP); Ryo Hasegawa, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/022,127

(22) Filed: Sep. 16, 2020

(65) Prior Publication Data

US 2021/0006701 A1 Jan. 7, 2021

Related U.S. Application Data

(63) Continuation of application No. PCT/JP2019/008920, filed on Mar. 6, 2019.

(30) Foreign Application Priority Data

Mar. 23, 2018 (JP) .............................. JP2018-057244

(51) Int. Cl.
*H04N 5/235* (2006.01)
*H04N 5/232* (2006.01)
*H04N 5/238* (2006.01)

(52) U.S. Cl.
CPC ........... *H04N 5/2351* (2013.01); *H04N 5/238* (2013.01); *H04N 5/23212* (2013.01)

(58) Field of Classification Search
CPC .. H04N 5/2351; H04N 5/23212; H04N 5/238; H04N 5/232935; H04N 5/232127;
(Continued)

(56) References Cited

U.S. PATENT DOCUMENTS 5,815,743 A * 9/1998 Ohmori .............. G03B 7/09979
396/61
9,467,614 B2 * 10/2016 Park ....................... G03B 13/36
(Continued)

FOREIGN PATENT DOCUMENTS

| JP | H07120309 | 5/1995 |
| JP | 2002365522 | 12/2002 |

(Continued)

OTHER PUBLICATIONS

"International Search Report (Form PCT/ISA/210) of PCT/JP2019/008920," dated Jun. 4, 2019, with English translation thereof, pp. 1-3.

(Continued)

*Primary Examiner* — Shahbaz Nazrul
(74) *Attorney, Agent, or Firm* — JCIPRNET

(57) ABSTRACT

An imaging control device includes: a brightness measurer that acquires a first captured image signal obtained from an imager imaging a subject through a focus lens, and obtains brightness of each of divided areas of a focusing target area set in the first captured image signal; an imaging condition controller that controls an imaging condition of the imager to a state where brightness of a lowest divided area which is one of the divided areas having lowest brightness is set to the set value; a transmittance controller that decreases brightness of other divided areas than the lowest divided area by controlling light transmittance of the areas corresponding to the other divided areas; and a focusing controller that performs focusing control for the focus lens based on the focusing target area of a second captured image signal in a specific state.

19 Claims, 11 Drawing Sheets

(58) Field of Classification Search
CPC . G02B 7/28; G03B 7/28; G03B 11/00; G03B 13/36
See application file for complete search history.

(56) References Cited

U.S. PATENT DOCUMENTS

2014/0211050 A1* 7/2014 Nakamaru ......... H04N 5/23293
348/252
2016/0150152 A1* 5/2016 Nakamaru ............... G03B 3/10
348/354

FOREIGN PATENT DOCUMENTS

JP 2013012997 1/2013
JP 2016015599 1/2016

OTHER PUBLICATIONS

"Written Opinion of the International Searching Authority (Form PCT/ISA/237) of PCT/JP2019/008920," dated Jun. 4, 2019, with English translation thereof, pp. 1-6.
"International Preliminary Report on Patentability (Form PCT/IB/373) of PCT/JP2019/008920," dated Sep. 29, 2020, with English translation thereof, pp. 1-7.

* cited by examiner

IMAGING CONTROL DEVICE, IMAGING APPARATUS, IMAGING CONTROL METHOD, AND IMAGING CONTROL PROGRAM

CROSS REFERENCE TO RELATED APPLICATION

This is a continuation of International Application No. PCT/JP2019/008920 filed on Mar. 6, 2019, and claims priority from Japanese Patent Application No. 2018-057244 filed on Mar. 23, 2018, the entire disclosures of which are incorporated herein by reference.

BACKGROUND OF THE INVENTION

1. Field of the Invention

The present invention relates to an imaging control device, an imaging apparatus, an imaging control method, and a non-transitory computer readable medium storing an imaging control program.

2. Description of the Related Art

In JP2013-012997A and JP1995-120309A (JP-H7-120309A), an imaging apparatus comprising an optical element that has variable transmittance and can adjust the quantity of light incident on an imager is disclosed. The imaging apparatus disclosed in JP2013-012997A corrects the quantity of received light for a washed-out region outside a high brightness side dynamic range of the imager and increases the dynamic range by partially decreasing the quantity of subject light using the optical element.

The imaging apparatus disclosed in JP1995-120309A (JP-H7-120309A), in a case where a part having high brightness is present in a field of view, prevents saturation by decreasing transmittance corresponding to the part of the optical element and enables accurate light measurement.

SUMMARY OF THE INVENTION

In a case of performing auto focus (AF; automatic focusing control) in the imaging apparatus, image data in a focusing target area set in captured image data obtained by imaging a subject is used. In a case where subjects having different brightness coexist in the focusing target area and, for example, exposure at the time of imaging for AF is to be determined in accordance with an average value of the brightness of the subjects in the focusing target area, there is a possibility that a focal point cannot be set to a person in a situation where the person to which the focal point is desired to be set is significantly dark like at the time of backlight.

In JP2013-012997A and JP1995-120309A (JP-H7-120309A), in the case of performing light measurement, only preventing saturation of an excessively bright subject region is considered, and a point of improving the accuracy of AF is not considered.

The present invention is conceived in view of the above matter, and an object thereof is to provide an imaging control device, an imaging apparatus, an imaging control method, and an imaging control program capable of improving focusing accuracy.

An imaging control device of the present invention comprises a brightness measurer that acquires a first captured image signal obtained from an imager imaging a subject through a focus lens by causing the imager to image the subject, and obtains brightness of each divided area of a focusing target area set in the first captured image signal, an imaging condition controller that, based on a set value of brightness determined depending on the brightness of each divided area, controls an imaging condition of the imager to a state where brightness of a lowest divided area which is the divided area having the lowest brightness is set to the set value, a transmittance controller that, in an optical element which has variable light transmittance for each of a plurality of areas and is arranged ahead of the imager, decreases brightness of other divided areas except for the lowest divided area by controlling light transmittance of the areas corresponding to the other divided areas, and a focusing controller that performs focusing control for the focus lens based on the focusing target area of a second captured image signal obtained from the imager by causing the imager to image the subject in a state where the imaging condition is controlled by the imaging condition controller and the light transmittance is controlled by the transmittance controller.

An imaging apparatus of the present invention comprises the imaging control device and the imager.

An imaging control method of the present invention comprises a brightness measurement step of acquiring a first captured image signal obtained from an imager imaging a subject through a focus lens by causing the imager to image the subject, and obtaining brightness of each divided area of a focusing target area set in the first captured image signal, an imaging condition control step of, based on a set value of brightness determined depending on the brightness of each divided area, controlling an imaging condition of the imager to a state where brightness of a lowest divided area which is the divided area having the lowest brightness is set to the set value, a transmittance control step of, in an optical element which has variable light transmittance for each of a plurality of areas and is arranged ahead of the imager, decreasing brightness of other divided areas except for the lowest divided area by controlling light transmittance of the areas corresponding to the other divided areas, and a focusing control step of performing focusing control for the focus lens based on the focusing target area of a second captured image signal obtained from the imager by causing the imager to image the subject in a state where the imaging condition is controlled in the imaging condition control step and the light transmittance is controlled in the transmittance control step.

An imaging control program of the present invention causes a computer to execute a brightness measurement step of acquiring a first captured image signal obtained from an imager imaging a subject through a focus lens by causing the imager to image the subject, and obtaining brightness of each divided area of a focusing target area set in the first captured image signal, an imaging condition control step of, based on a set value of brightness determined depending on the brightness of each divided area, controlling an imaging condition of the imager to a state where brightness of a lowest divided area which is the divided area having the lowest brightness is set to the set value, a transmittance control step of, in an optical element which has variable light transmittance for each of a plurality of areas and is arranged ahead of the imager, decreasing brightness of other divided areas except for the lowest divided area by controlling light transmittance of the areas corresponding to the other divided areas, and a focusing control step of performing focusing control for the focus lens based on the focusing target area of a second captured image signal obtained from the imager by causing the imager to image the subject in a state where the imaging condition is controlled in the imaging condition control step and the light transmittance is controlled in the transmittance control step.

According to the present invention, an imaging control device, an imaging apparatus, an imaging control method, and an imaging control program capable of improving focusing accuracy can be provided.

DESCRIPTION OF THE PREFERRED EMBODIMENTS

Hereinafter, an embodiment of the present invention will be described with reference to the drawings.

Figure 1:
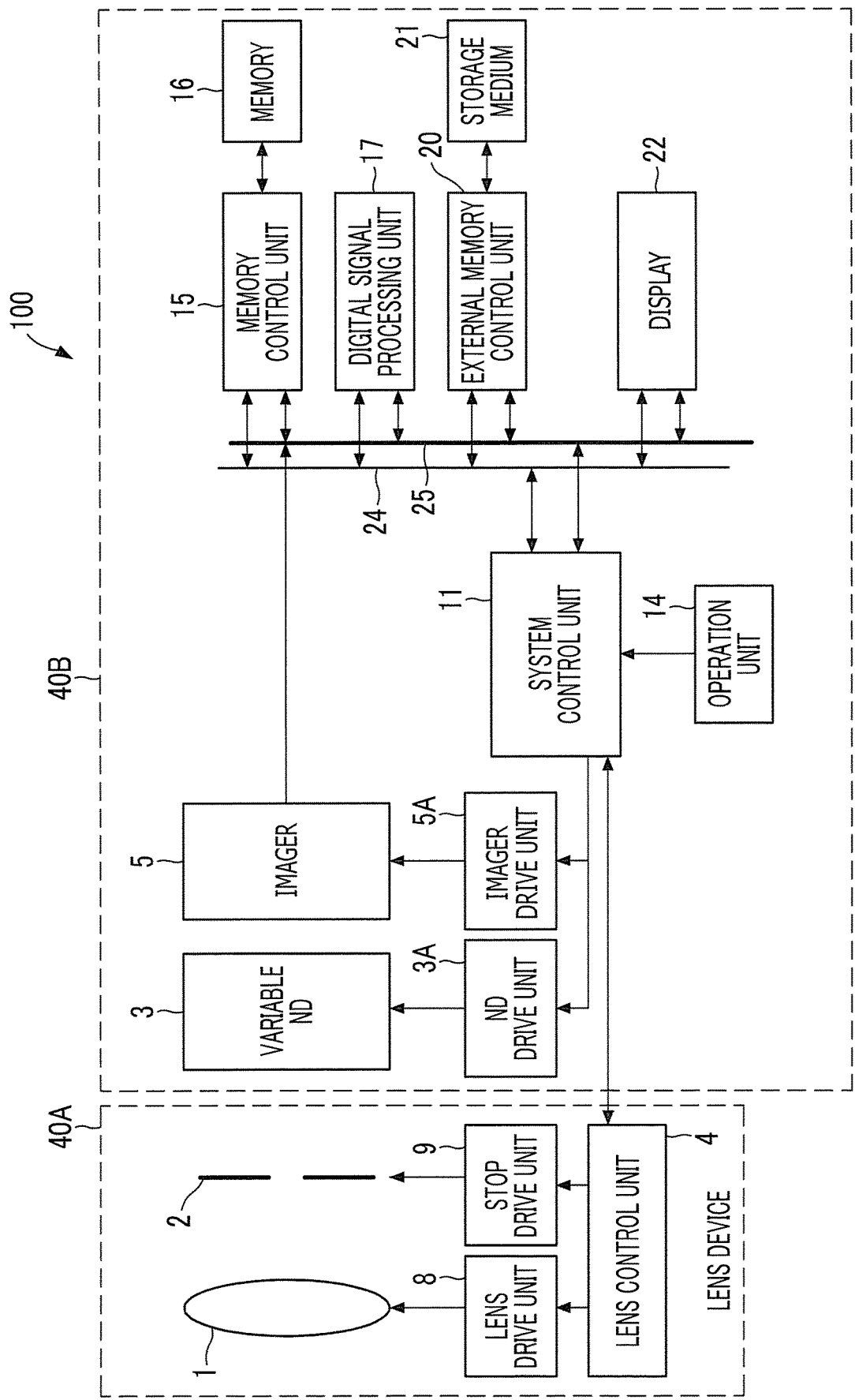
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40A that includes an imaging lens 1, a stop 2, a lens control unit 4, a lens drive unit 8, and a stop drive unit 9; and a main body unit 40B.

The lens device 40A may be attachable and detachable with respect to the main body unit 40B or may be integrated with the main body unit 40B. In a configuration in which the lens device 40A is attachable and detachable with respect to the main body unit 40B, the main body unit 40B constitutes the imaging apparatus.

The imaging lens 1 includes a focus lens, a zoom lens, or the like that can be moved in an optical axis direction. The focus lens is a lens for adjusting a focal position of the imaging lens 1 and is composed of a single lens or a plurality of lenses. The focal position is adjusted by moving the focus lens in the optical axis direction of the imaging lens 1.

A liquid lens that can change the focal position by variably controlling a curved surface of the lens may be used as the focus lens.

The lens control unit 4 of the lens device 40A is configured to be capable of communicating with a system control unit 11 of the main body unit 40B in a wired or wireless manner.

In accordance with an instruction from the system control unit 11, the lens control unit 4 changes the position (focal position) of a principal point of the focus lens by controlling the focus lens included in the imaging lens 1 through the lens drive unit 8, changes the position of the zoom lens by controlling the zoom lens included in the imaging lens 1 through the lens drive unit 8, or controls an F number of the stop 2 through the stop drive unit 9.

The main body unit 40B comprises an imager 5 such as a charged coupled device (CCD) type image sensor or a metal oxide semiconductor (MOS) type image sensor that images a subject through an imaging optical system including the imaging lens 1 and the stop 2, an imager drive unit 5A that drives the imager 5, a neutral density (ND) filter 3 that is arranged between the imager 5 and the imaging optical system, an ND drive unit 3A that drives the variable ND filter 3, the system control unit 11 that manages and controls the entire main body unit 40B, and an operation unit 14.

The imager 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imager 5 will be referred to as a captured image signal.

The imager drive unit 5A drives the imager 5 by generating a drive signal based on an instruction from the system control unit 11 and supplying the drive signal to the imager 5.

The variable ND filter 3 is an optical element for controlling the quantity of light incident on the imager 5 and can partially change light transmittance. The variable ND filter 3 is arranged ahead of (subject side of the imaging surface) the imaging surface of the imager 5.

Specifically, the variable ND filter 3 has a configuration in which physical property elements (for example, liquid crystal elements or electrochromic elements) that can change the light transmittance by an applied voltage are two-dimensionally arranged.

The variable ND filter 3 may be integrally formed with the imager 5. For example, the imager 5 comprises an imager chip, a package that accommodates the imager chip, and a protective cover that seals the package. The variable ND filter 3 may be laminated on the protective cover.

The ND drive unit 3A controls the transmittance of the variable ND filter 3 by controlling a voltage applied to each physical property element of the variable ND filter 3 in accordance with an instruction from the system control unit 11.

The system control unit 11 manages and controls the entire digital camera 100. A hardware structure of the system control unit 11 corresponds to various processors that perform processing by executing programs including an imaging control program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The main body unit 40B further comprises a memory 16 including a random access memory (RAM) and a read only memory (ROM), a memory control unit 15 that controls data storage in the memory 16 and data read from the memory 16, a digital signal processing unit 17 that generates captured image data in accordance with various formats such as Joint Photographic Experts Group (JPEG) format by performing digital signal processing on the captured image signal output from the imager 5, an external memory control unit 20 that controls data storage in a storage medium 21 and data read from the storage medium 21, and a display 22 including an organic electroluminescence (EL) panel, a liquid crystal panel, or the like for displaying images.

The ROM included in the memory 16 stores programs including the imaging control program.

The memory control unit 15, the digital signal processing unit 17, the external memory control unit 20, and the display 22 are connected to each other through a control bus 24 and a data bus 25 and are controlled by instructions from the system control unit 11.

A hardware structure of the digital signal processing unit 17 corresponds to the above illustrated various processors that perform processing by executing programs including the imaging control program. The digital signal processing unit 17 functions as an image processor.

Figure 2:
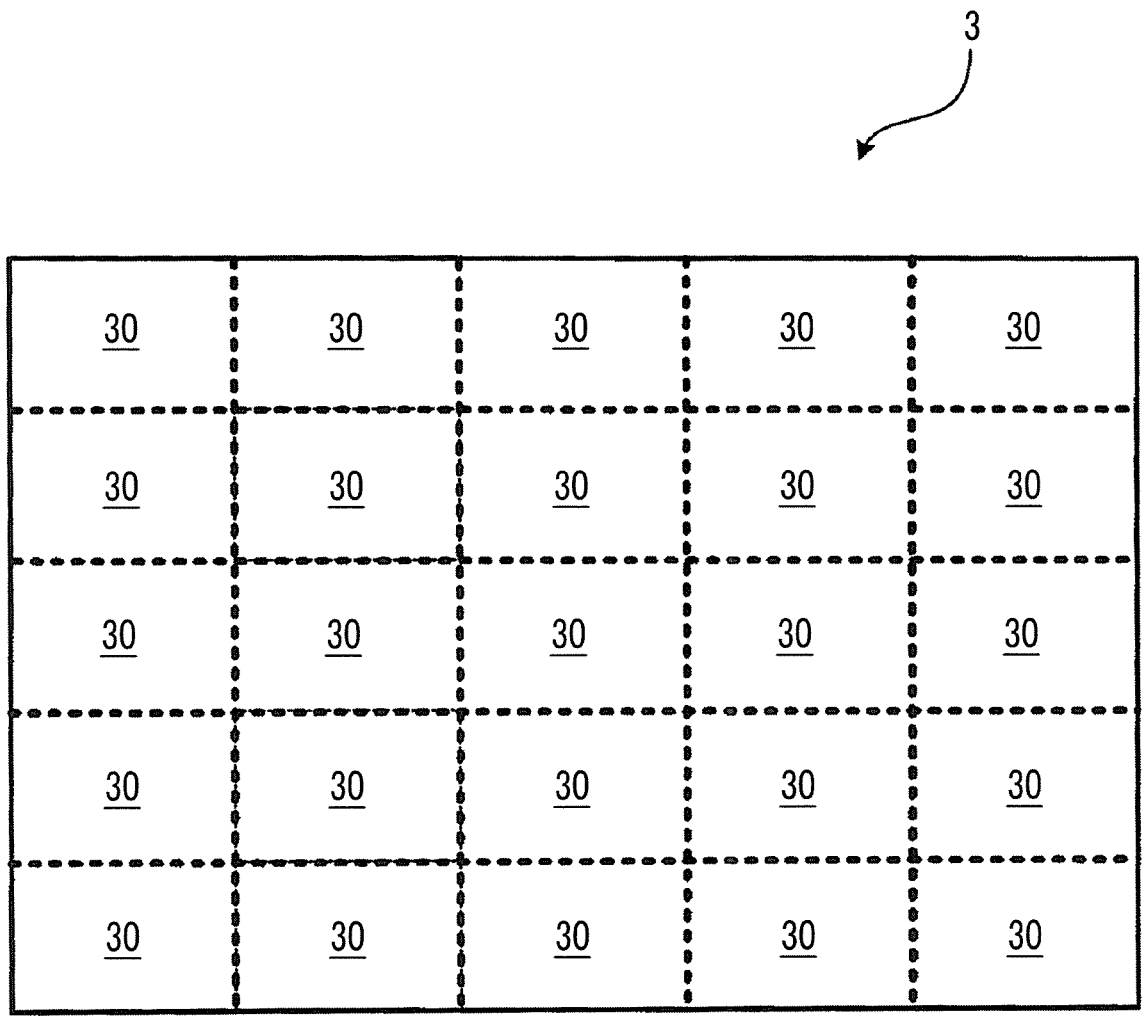
FIG. 2 is a schematic diagram illustrating an example of division of a variable ND filter 3.
Figure 3:
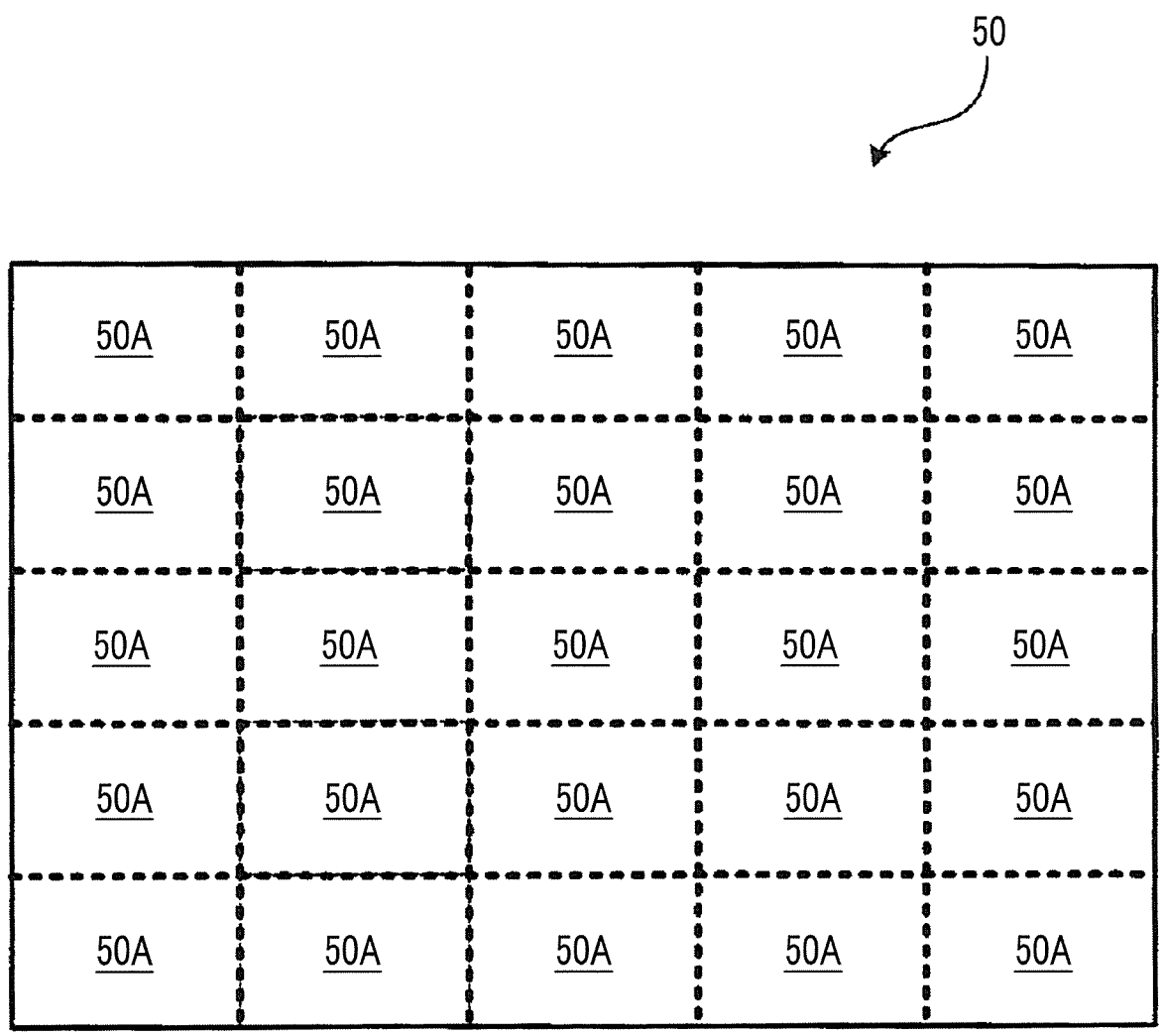
FIG. 3 is a schematic diagram illustrating an example of division of a captured image signal 50.

For example, a light transmission area of the variable ND filter 3 is handled as being divided into a plurality of (in the example in FIG. 2, 25) blocks 30 as illustrated in FIG. 2. As illustrated in FIG. 3, a captured image signal 50 output from the imager 5 is handled as a collection of a plurality of (in the example in FIG. 2, 25) blocks 50A corresponding to the blocks 30 in FIG. 2, respectively. Each block 50A is obtained by photoelectrically converting subject light transmitted through the corresponding block 30.

The digital camera 100 has an AF function and can preset a subject region that is included in the captured image signal output from the imager 5 and to which a focal point is to be set. An area that is set in the captured image signal and to which the focal point is to be set will be referred to as a focusing target area.

Figure 4:
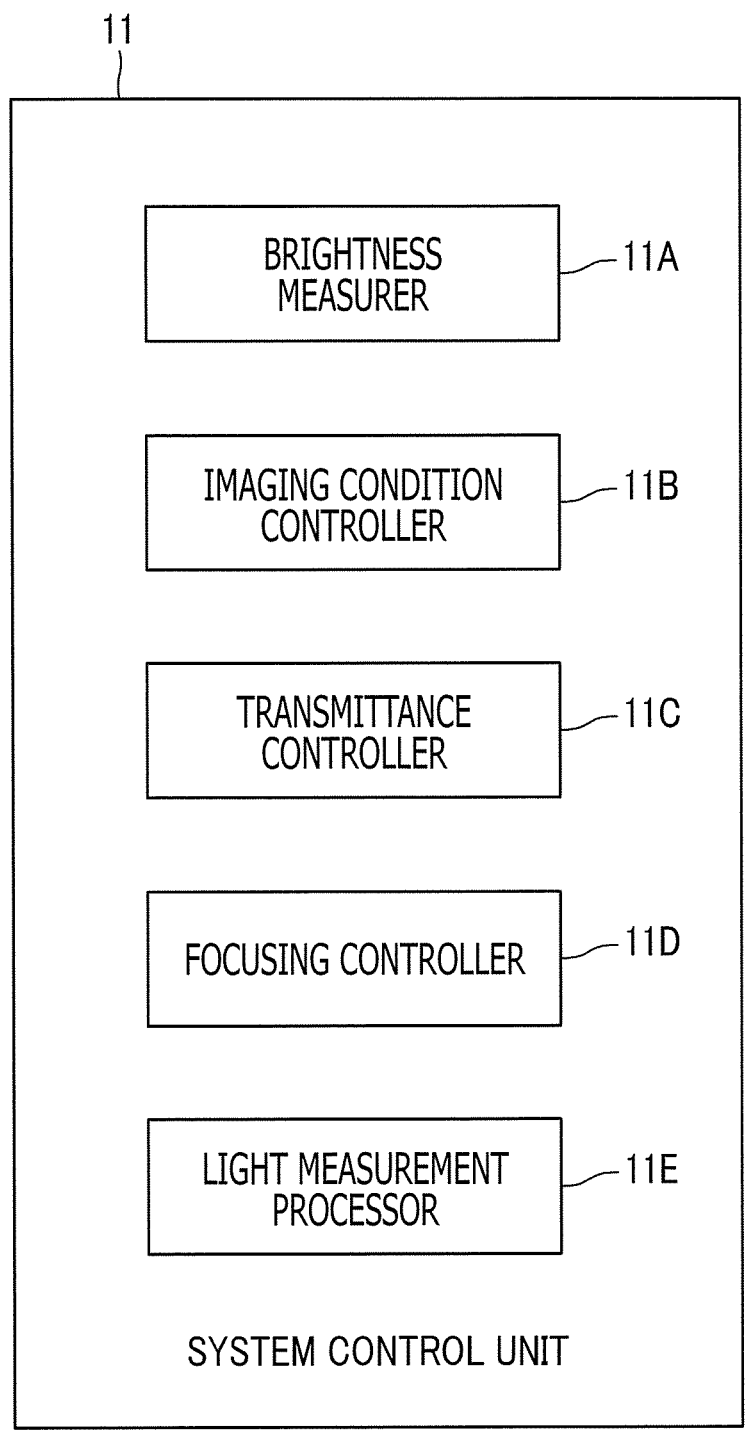
FIG. 4 is a function block diagram of a system control unit 11 illustrated in FIG. 1.

FIG. 4 is a function block diagram of the system control unit 11 illustrated in FIG. 1.

By executing the programs stored in the ROM of the memory 16 including the imaging control program, the system control unit 11 functions as a brightness measurer 11A, an imaging condition controller 11B, a transmittance controller 11C, a focusing controller 11D, and a light measurement processor 11E.

The light measurement processor 11E measures the brightness of the subject based on the captured image signal output from the imager 5, determines appropriate exposure based on the measured brightness, and determines an imaging condition (an exposure time period of the imager 5, the F number of the stop 2, imaging sensitivity, and the like) for imaging for storage in the storage medium 21 based on the appropriate exposure.

The brightness measurer 11A, the imaging condition controller 11B, the transmittance controller 11C, and the focusing controller 11D are function blocks operating at the time of AF.

The brightness measurer 11A divides the focusing target area of the captured image signal output from the imager 5 into a plurality of divided areas and obtains brightness for each divided area.

In the following description, one of the blocks 50A illustrated in FIG. 3 will be set as the focusing target area. For example, the brightness measurer 11A divides the block 50A into three parts of a divided area AF1, a divided area AF2, and a divided area AF3 as illustrated in FIG. 5.

Figure 5:
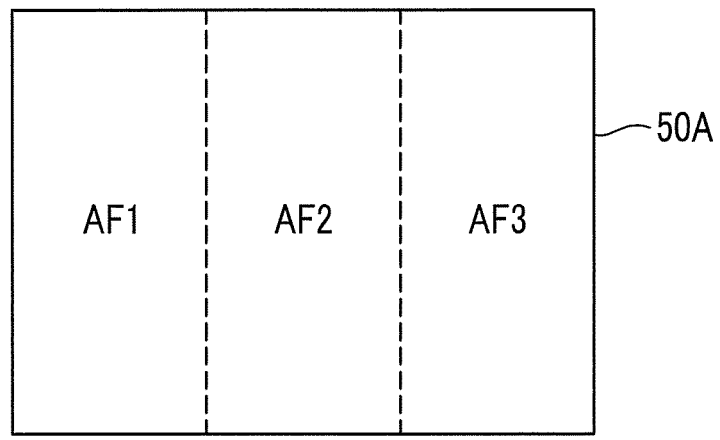
FIG. 5 is a diagram illustrating an example of division of a block 50A.
Figure 6:
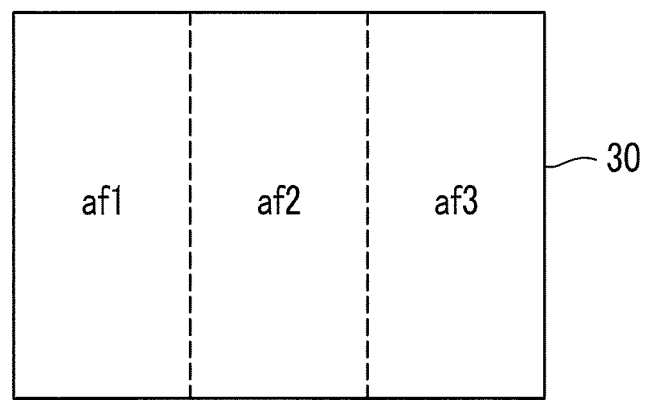
FIG. 6 is a diagram illustrating a block 30 of the variable ND filter 3 corresponding to the block 50A illustrated in FIG. 5.

FIG. 6 is a diagram illustrating the block 30 of the variable ND filter 3 corresponding to the block 50A illustrated in FIG. 5. As illustrated in FIG. 6, the block 30 corresponding to the focusing target area is divided into an area af1 corresponding to the divided area AF1, an area af2 corresponding to the divided area AF2, and an area af3 corresponding to the divided area AF3. Each of the divided areas AF1 to AF3 in FIG. 5 is obtained by photoelectric conversion from the subject light transmitted through the corresponding areas af1 to af3.

The imaging condition controller 11B controls the imaging condition of the imager 5 at the time of imaging for AF based on a set value of brightness determined based on the brightness of each of the divided areas AF1 to AF3 obtained by the brightness measurer 11A. Specifically, the imaging condition controller 11B controls the imaging condition to a state where the brightness of a lowest divided area that is a divided area having the lowest brightness among the divided areas AF1 to AF3 is set to the set value.

Figure 7:
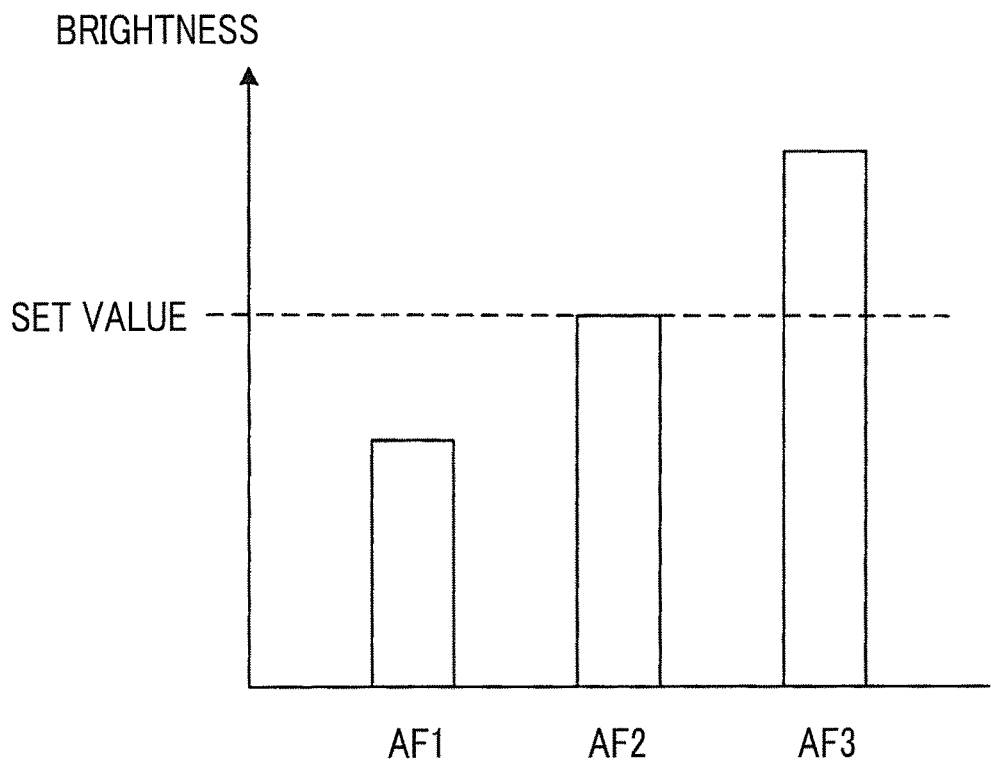
FIG. 7 is a diagram illustrating one example of brightness of each of divided areas AF1 to AF3 in FIG. 5 in a focusing target area.

FIG. 7 is a diagram illustrating one example of the brightness of each of the divided areas AF1 to AF3 in FIG. 5 in the focusing target area. In the example illustrated in FIG. 7, the brightness of the divided area AF1 is the lowest, and the divided area AF1 is the lowest divided area.

For example, the set value of brightness is obtained as an average value of the brightness of each of the divided areas AF1 to AF3. This set value may be a representative value of the brightness of each of the divided areas AF1 to AF3. For example, the most frequent value or the center value may be used as the set value.

In the example illustrated in FIG. 7, the brightness of the divided area AF2 is set to the set value. The brightness of the divided area AF1 is less than the set value. The brightness of the divided area AF3 is greater than the set value.

In a case where a measurement result of brightness of the brightness measurer 11A is as illustrated in FIG. 7, the imaging condition controller 11B determines exposure with which the brightness of the divided area AF1 which is the lowest divided area is set to the set value, and sets the imaging condition for obtaining the exposure.

Figure 8:
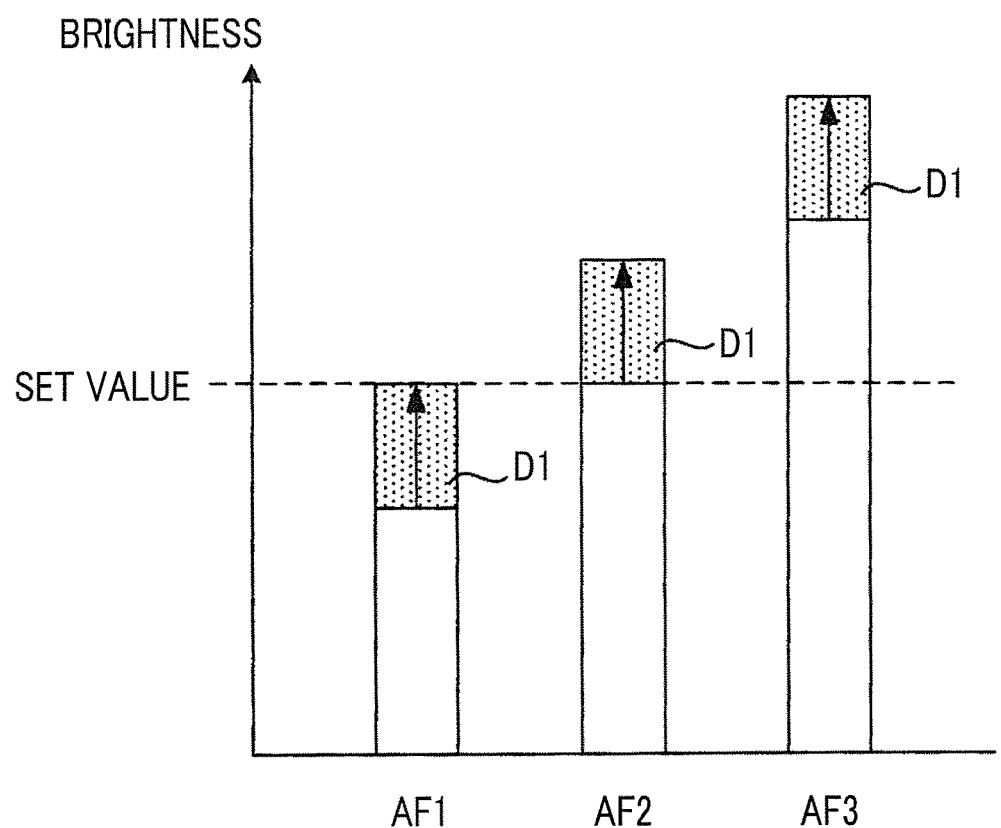
FIG. 8 is a diagram illustrating the brightness of each of the divided areas AF1 to AF3 in a state where an imaging condition is controlled from a state in FIG. 7 by an imaging condition controller 11B.

FIG. 8 is a diagram illustrating the brightness of each of the divided areas AF1 to AF3 in a state where the imaging condition is set from the state in FIG. 7 by the imaging condition controller 11B. In the example in FIG. 8, by setting the imaging condition, the brightness of each of the divided areas AF1 to AF3 is increased by a correction amount D1 corresponding to a difference between the original brightness of the divided area AF1 and the set value.

The transmittance controller 11C decreases the brightness of the other divided areas except for the lowest divided area among the divided areas AF1 to AF3 in the variable ND filter 3 by controlling the light transmittance of the areas corresponding to the other divided areas.

Figure 9:
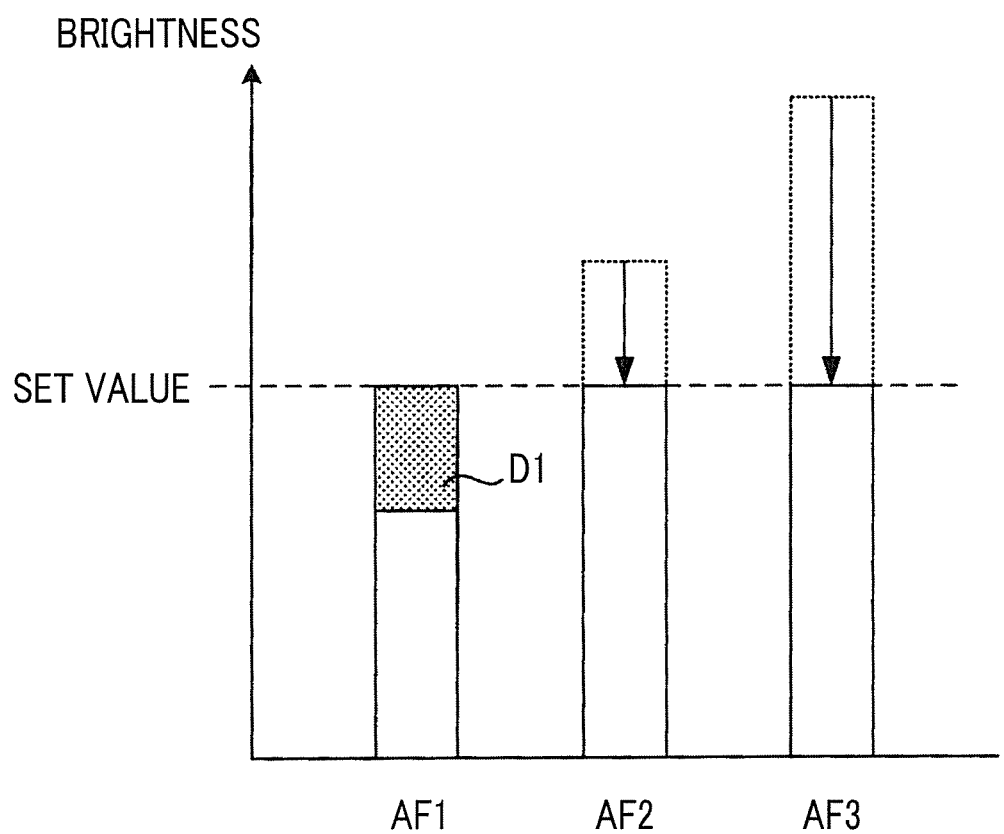
FIG. 9 is a diagram illustrating the brightness of each of the divided areas AF1 to AF3 in a state where light transmittance is controlled from a state in FIG. 8 by a transmittance controller 11C.

In the examples in FIG. 7 and FIG. 8, the divided area AF2 and the divided area AF3 are the other divided areas except for the lowest divided area. The transmittance controller 11C obtains a state where the brightness of each of the divided area AF2 and the divided area AF3 is set to the set value as illustrated in FIG. 9 by controlling the light transmittance of the area af2 corresponding to the divided area AF2 and the light transmittance of the area af3 corresponding to the divided area AF3.

A state where the brightness of each of the divided areas AF1 to AF3 is uniform can be obtained by the above processing.

The focusing controller 11D performs focusing control for the focus lens based on the focusing target area of the captured image signal obtained from the imager 5 by imaging the subject by the imager 5 in such a state. The focusing control may be performed using either a contrast AF method or a phase difference AF method.

Figure 10:
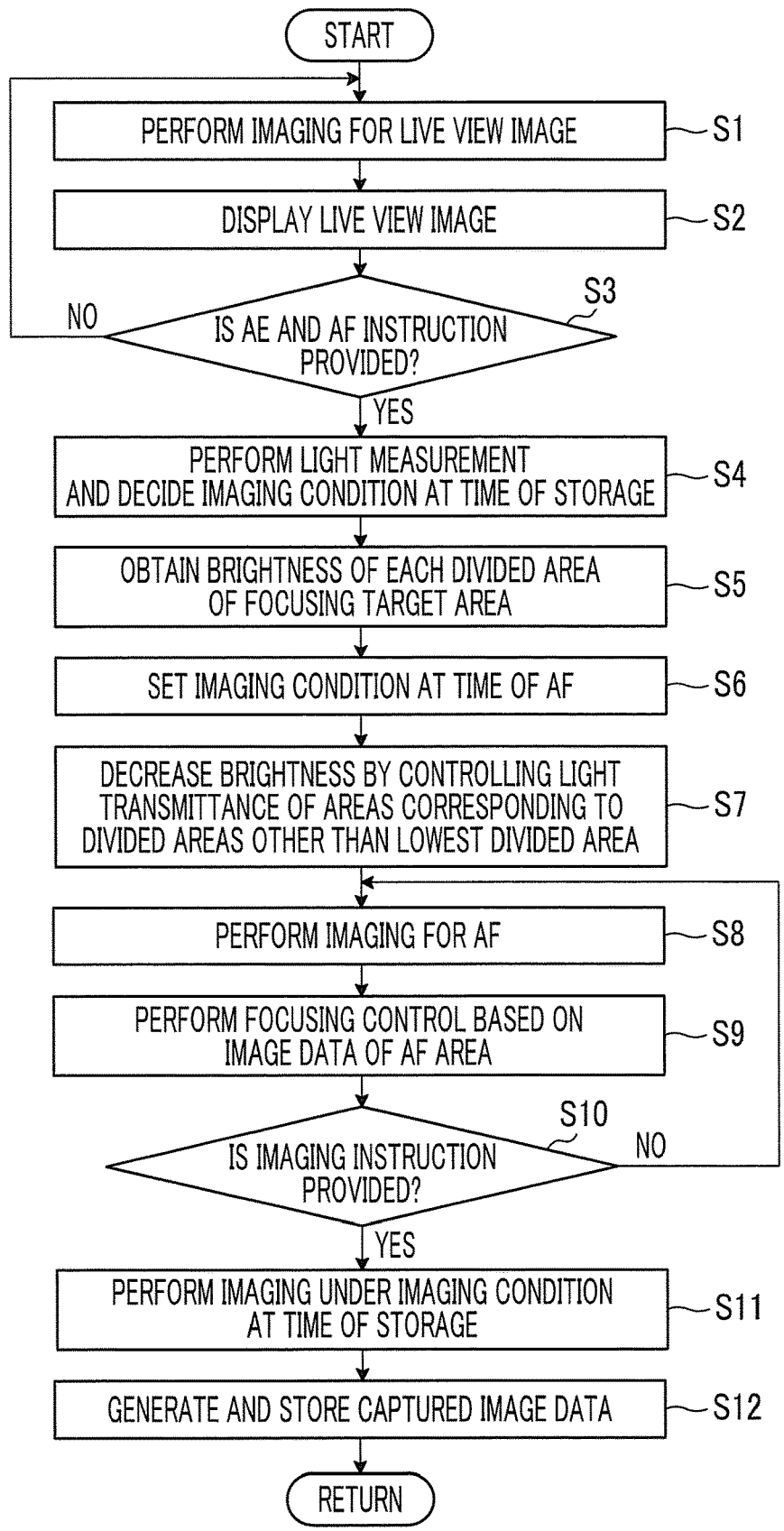
FIG. 10 is a flowchart for describing an operation at a time of an imaging mode of the digital camera 100 illustrated in FIG. 1.

FIG. 10 is a flowchart for describing an operation at the time of an imaging mode of the digital camera 100 illustrated in FIG. 1.

In an initial state where the imaging mode is set, the transmittance controller 11C of the system control unit 11 controls the transmittance of all physical property elements of the variable ND filter 3 to 100%.

In a case where the imaging mode is set, the system control unit 11 causes the imager 5 to perform imaging for displaying a live view image (step S1).

Image data for live view display is generated by causing the digital signal processing unit 17 to process the captured image signal output from the imager 5 by imaging, and the live view image is displayed on the display 22 based on the image data (step S2).

After step S2, processing of step S1 and step S2 is repeated until an AF and auto exposure (AE) execution instruction is provided by performing pushing or the like on a release button included in the operation unit 14 in step S3.

In a case where the AF and AE execution instruction is provided in step S3 (step S3: YES), the light measurement processor 11E of the system control unit 11 acquires the captured image signal output from the imager 5 and measures the brightness of the subject based on the captured image signal. Appropriate exposure is determined based on the brightness, and the imaging condition at the time of storage is determined based on the appropriate exposure (step S4). Step S4 constitutes a light measurement processing step.

The brightness measurer 11A of the system control unit 11 acquires the captured image signal output from the imager 5 and obtains the brightness of each of the divided areas AF1 to AF3 of the focusing target area of the captured image signal (step S5). Step S5 constitutes a brightness measurement step.

The imaging condition controller 11B of the system control unit 11 sets the imaging condition at the time of imaging for AF using the above method based on the brightness obtained in step S5 (step S6). This processing sets a state where the brightness of the lowest divided area (for example, the divided area AF1 in FIG. 5) in the focusing target area is increased to the set value. Step S6 constitutes an imaging condition control step.

Next, the transmittance controller 11C of the system control unit 11 decreases the brightness of the divided areas other than the lowest divided area to the set value by controlling the light transmittance of the areas (for example, the areas af2 and af3 in FIG. 6) corresponding to the divided areas (for example, the divided areas AF2 and AF3 in FIG. 5) other than the lowest divided area in the variable ND filter 3 (step S7). Step S7 constitutes a transmittance control step.

Next, the focusing controller 11D of the system control unit 11 causes the imager 5 to perform imaging for AF in the state of the light transmittance controlled in step S7 under the imaging condition set in step S6 (step S8).

The focusing controller 11D performs the focusing control for changing the position of the principal point of the focus lens based on the captured image signal output from the imager 5 by imaging in step S8 (step S9). Step S9 constitutes a focusing control step.

Then, in a case where an imaging instruction is provided by pushing a release button included in the operation unit 14 (step S10: YES), the system control unit 11 restores the transmittance of all physical property elements of the variable ND filter 3 to 100%, sets the imaging condition to a content determined in step S4, and causes the imager 5 to perform imaging for storage (step S11). In a case where the imaging instruction is not provided in step S10 (step S10: NO), processing returns to step S8.

After step S11, the captured image data is generated by causing the digital signal processing unit 17 to process the captured image signal output from the imager 5 by imaging in step S11, and is stored in the storage medium 21 (step S12). After step S12, processing returns to step S1 (return).

As described above, according to the digital camera 100, imaging for AF can be performed in a state where the brightness of each divided area of the focusing target area is equal, and a state close to appropriateness. Thus, even in a case where a significantly dark subject is partially included in the focusing target area, imaging for AF can be performed in a state where the dark subject is brightened, and the focusing control can be performed with high accuracy. In addition, for a part of the focusing target area that is originally bright, light is reduced to appropriate brightness by the variable ND filter 3. Thus, the focusing control can be performed with high accuracy.

In the imaging condition set in step S6 in FIG. 10, it is preferable that the F number of the stop 2 is set to the same value as the F number included in the imaging condition determined in step S4. For example, in a case where the F number is changed to the stop side, the imaging condition may be determined such that the brightness of the lowest divided area is set to the set value, by increasing the exposure time period or increasing the imaging sensitivity.

By doing so, the stop 2 does not need to be driven between imaging for AF in step S8 and imaging for storage in step S11. Thus, imaging for storage can be performed at a high speed.

Alternatively, in the imaging condition set in step S6 in FIG. 10, the F number of the stop 2 may be set to the same value as the F number included in the imaging condition at the time of imaging for displaying the live view image in step S1.

Even by doing so, the number of times the focus lens is moved can be reduced, and imaging for AF can be performed at a high speed. In addition, in a case where the focusing control performed by the focusing controller 11D is performed using the phase difference AF method and the F number is on an opening side at the time of imaging for displaying the live view image, focusing accuracy can be increased.

Even in a case where the focusing control performed by the focusing controller 11D is performed using the contrast AF method, a distance in which the focus lens is moved is decreased as the stop approaches opening. Thus, the focusing accuracy can be increased by reducing a calculation error of a focusing evaluation value.

While description is omitted in FIG. 10, in a case where imaging for AF is performed in step S8, display image data is generated by causing the digital signal processing unit 17 to process the captured image signal output from the imager 5 by imaging. The display image data is output to the display 22 and is displayed on the display 22 as the live view image.

In the case of displaying the live view image from the captured image signal obtained by imaging for AF in step S8, the live view image is different from the actual look of the subject since the brightness of the captured image signal is corrected with respect to the actual brightness of the subject in step S6 and step S7.

In order to deal with the difference, first, the digital signal processing unit 17 decreases the brightness of the entire captured image signal obtained by imaging for AF in step S8 by the difference (correction amount D1 in FIG. 8) between the brightness of the lowest divided area obtained in step S5 and the set value. Furthermore, the digital signal processing unit 17 increases the brightness of each divided area other than the lowest divided area in the focusing target area of the captured image signal, which is obtained by imaging for AF in step S8, to the brightness of each divided area obtained in step S5. This processing constitutes an image processing step.

By generating the display image data by processing the captured image signal obtained by performing such processing, the difference between the live view image based on the display image data and the actual look of the subject being imaged can be eliminated, and both improvement in focusing accuracy and high quality of the live view image can be achieved.

While an operation in the case of imaging a still picture is illustrated as imaging for storage in FIG. 10, high accuracy focusing control can be performed even during motion picture imaging in which the subject is significantly changed, by performing processing of step S5 to step S9 at a frequency of once for a plurality of frames (for example, four frames) after an instruction to start storing a motion picture is provided in the case of motion picture imaging.

In the above description, the transmittance controller 11C of the system control unit 11 controls the light transmittance of the variable ND filter 3 such that the brightness of each of the divided areas AF2 and AF3 other than the lowest divided area in the focusing target area is set to the set value. Hereinafter, a modification example of control of the light transmittance performed by the transmittance controller 11C will be described.

Figure 11:
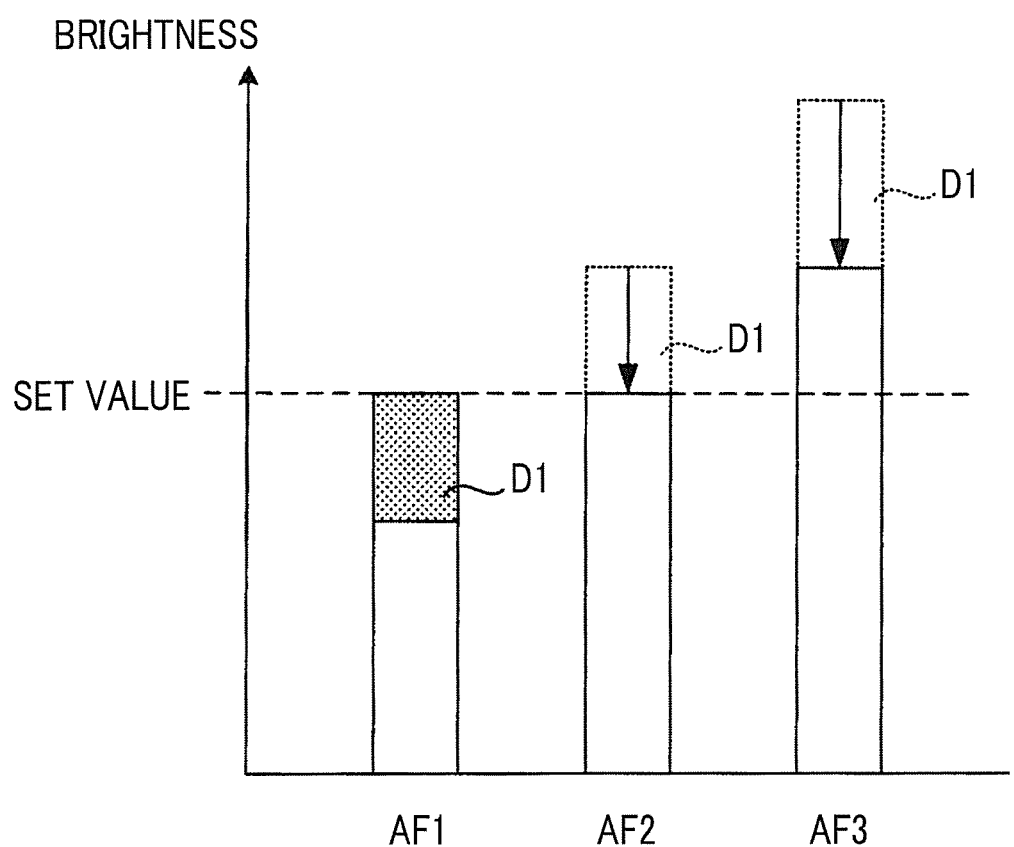
FIG. 11 is a diagram for describing a first modification example of control performed by the transmittance controller 11C.

FIG. 11 is a diagram for describing a first modification example of control performed by the transmittance controller 11C.

The transmittance controller 11C controls the light transmittance of the areas af2 and af3 corresponding to the divided areas AF2 and AF3 to a value with which the brightness of the divided areas AF2 and AF3 is decreased by the correction amount D1 as illustrated in FIG. 11, based on the imaging condition set by the imaging condition controller 11B in a state where the brightness of the focusing target area of the captured image signal is changed as illustrated in FIG. 8.

According to the first modification example, an excessive decrease in brightness of the divided area AF3 can be prevented. Thus, blocked-up shadows in the divided area AF3 can be prevented. By preventing blocked-up shadows, correction processing for displaying the live view image can be performed without problems, and the quality of the live view image can be improved.

In the case of performing the control in FIG. 11, in a case where the brightness of at least one of the divided area AF2 or the divided area AF3 is greater than or equal to a predetermined threshold value, the transmittance controller 11C may control the light transmittance of an area of the variable ND filter 3 corresponding to a divided area having brightness greater than or equal to the threshold value to a value with which the brightness of the divided area is set to the set value.

For a divided area having a certain degree of high brightness, the possibility of blocked-up shadows is low even in a case where brightness is decreased to the set value. Thus, by doing so, the focusing accuracy can be improved.

An imaging control device is configured with the brightness measurer 11A, the imaging condition controller 11B, the transmittance controller 11C, the focusing controller 11D, and the digital signal processing unit 17 above. The system control unit 11 may be configured to have the function of the digital signal processing unit 17.

In the digital camera 100 in FIG. 1, the variable ND filter 3 and the ND drive unit 3A may be incorporated in the attachable and detachable lens device 40A, and the lens control unit 4 may control the ND drive unit 3A in accordance with an instruction from the system control unit 11.

Next, a configuration of a smartphone as the imaging apparatus according to the embodiment of the present invention will be described.

Figure 12:
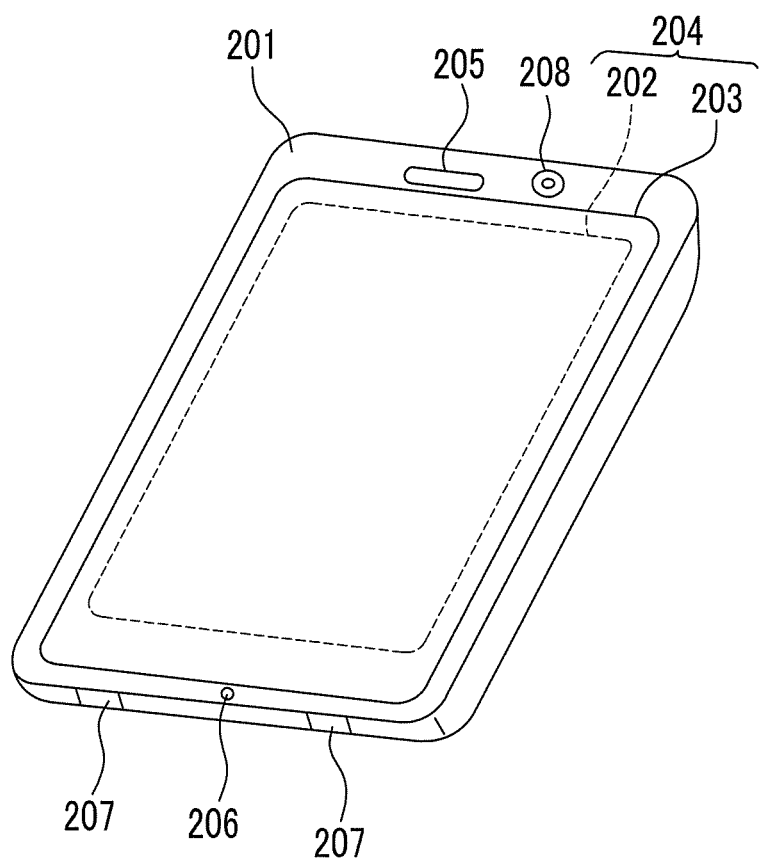
FIG. 12 illustrates an exterior of a smartphone 200 that is the imaging apparatus according to one embodiment of the present invention.

FIG. 12 illustrates an exterior of a smartphone 200 that is the imaging apparatus according to one embodiment of the present invention.

The smartphone 200 illustrated in FIG. 12 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 13:
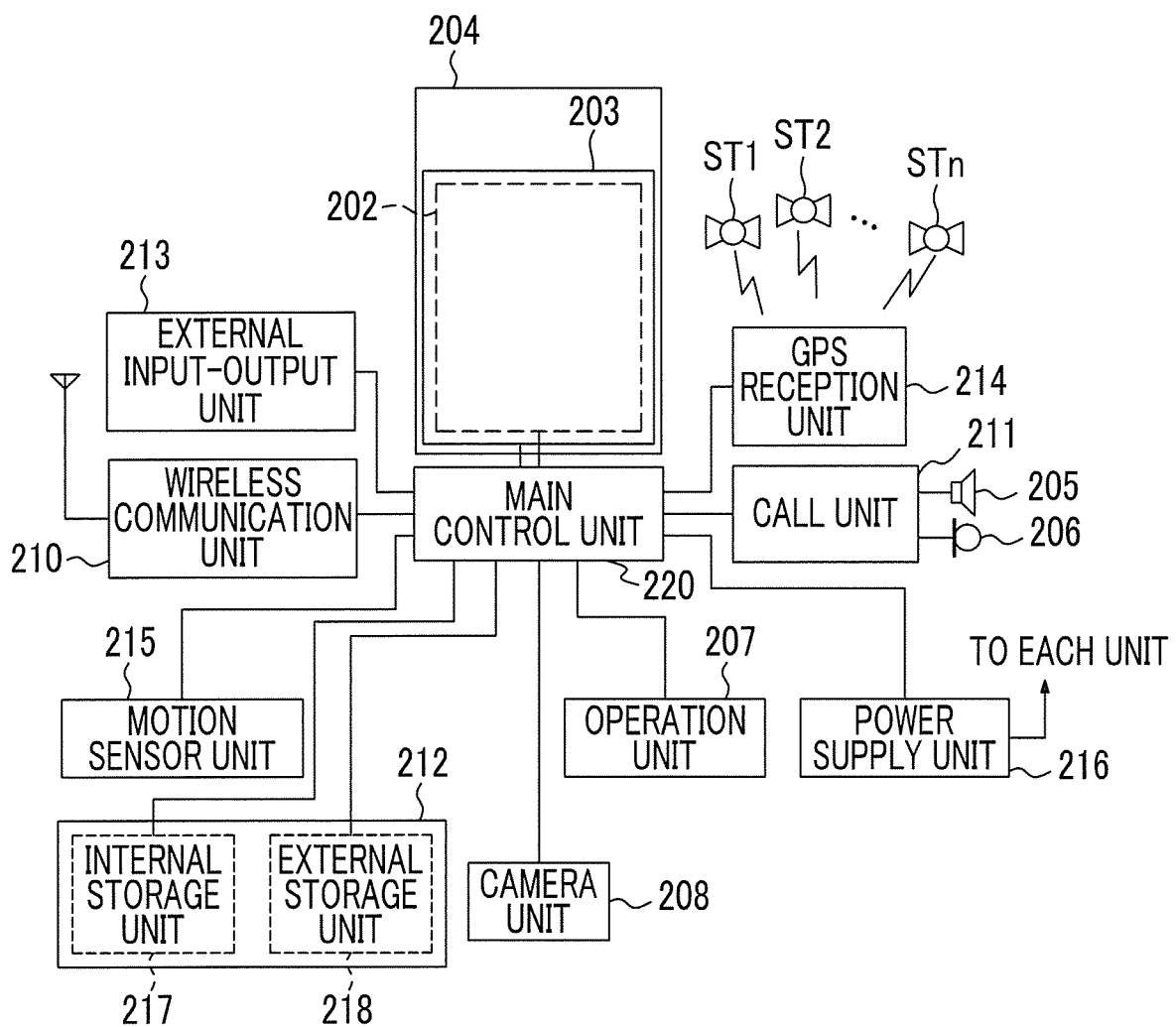
FIG. 13 is a block diagram illustrating a configuration of the smartphone 200 illustrated in FIG. 12.

FIG. 13 is a block diagram illustrating a configuration of the smartphone 200 illustrated in FIG. 12.

As illustrated in FIG. 13, a wireless communication unit 210, the display and input unit 204, a call unit 211, the operation unit 207, the camera unit 208, a storage unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 13, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 12, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 12, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the related art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the storage medium 21, the display 22, and the operation unit 14 in the digital camera 100 illustrated in FIG. 1.

A captured image generated by the camera unit 208 can be stored in the storage unit 212 or be output through the external input-output unit 213 or the wireless communication unit 210.

In the smartphone 200 illustrated in FIG. 12, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, the focusing accuracy can be improved.

As described thus far, the following matters are disclosed in the present specification.

(1) An imaging control device comprising a brightness measurer that acquires a first captured image signal obtained from an imager imaging a subject through a focus lens by causing the imager to image the subject, and obtains brightness of each divided area of a focusing target area set in the first captured image signal, an imaging condition controller that, based on a set value of brightness determined depending on the brightness of each divided area, controls an imaging condition of the imager to a state where brightness of a lowest divided area which is the divided area having the lowest brightness is set to the set value, a transmittance controller that, in an optical element which has variable light transmittance for each of a plurality of areas and is arranged ahead of the imager, decreases brightness of other divided areas except for the lowest divided area by controlling light transmittance of the areas corresponding to the other divided areas, and a focusing controller that performs focusing control for the focus lens based on the focusing target area of a second captured image signal obtained from the imager by causing the imager to image the subject in a state where the imaging condition is controlled by the imaging condition controller and the light transmittance is controlled by the transmittance controller.

(2) The imaging control device according to (1), in which the transmittance controller controls the light transmittance of the areas corresponding to the other divided areas to a value with which the brightness of the other divided areas is set to the set value.

(3) The imaging control device according to (1), in which the transmittance controller controls the light transmittance of the areas corresponding to the other divided areas to a value with which the brightness of the other divided areas is decreased by a difference between the brightness of the lowest divided area and the set value.

(4) The imaging control device according to (3), in which in a case where a divided area having brightness greater than or equal to a threshold value is present among the other divided areas, the transmittance controller controls the light transmittance of the area corresponding to the divided area to a value with which the brightness of the divided area is set to the set value.

(5) The imaging control device according to any one of (1) to (4), further comprising an image processor that generates display image data for display on a display from the second captured image signal obtained by decreasing brightness of the entire second captured image signal by a difference between the brightness of the lowest divided area obtained by the brightness measurer and the set value, and further, increasing the brightness of the other divided areas of the focusing target area in the second captured image signal to the brightness of the other divided areas obtained by the brightness measurer.

(6) The imaging control device according to any one of (1) to (5), in which imaging control for causing the imager to image the subject in a state where the imaging condition is controlled by the imaging condition controller and the light transmittance is controlled by the transmittance controller is executed at a frequency of once for a plurality of frames.

(7) The imaging control device according to any one of (1) to (6), further comprising a light measurement processor that measures brightness of the subject based on the first captured image signal, in which in a case of controlling the imaging condition to the state, the imaging condition controller sets an F number of a stop arranged ahead of the imager to the same value as the F number of the stop determined based on the brightness measured by the light measurement processor.

(8) The imaging control device according to any one of (1) to (6), in which in a case of controlling the imaging condition to the state, the imaging condition controller sets an F number of a stop arranged ahead of the imager to the same value as the F number of the stop at a time of imaging for obtaining the first captured image signal.

(9) An imaging apparatus comprising the imaging control device according to any one of (1) to (8), and the imager.

(10) The imaging apparatus according to (9), further comprising the optical element.

(11) An imaging control method comprising a brightness measurement step of acquiring a first captured image signal obtained from an imager imaging a subject through a focus lens by causing the imager to image the subject, and obtaining brightness of each divided area of a focusing target area set in the first captured image signal, an imaging condition control step of, based on a set value of brightness determined depending on the brightness of each divided area, controlling an imaging condition of the imager to a state where brightness of a lowest divided area which is the divided area having the lowest brightness is set to the set value, a transmittance control step of, in an optical element which has variable light transmittance for each of a plurality of areas and is arranged ahead of the imager, decreasing brightness of other divided areas except for the lowest divided area by controlling light transmittance of the areas corresponding to the other divided areas, and a focusing control step of performing focusing control for the focus lens based on the focusing target area of a second captured image signal obtained from the imager by causing the imager to image the subject in a state where the imaging condition is controlled in the imaging condition control step and the light transmittance is controlled in the transmittance control step.

(12) The imaging control method according to (11), in which in the transmittance control step, the light transmittance of the areas corresponding to the other divided areas is controlled to a value with which the brightness of the other divided areas is set to the set value.

(13) The imaging control method according to (11), in which in the transmittance control step, the light transmittance of the areas corresponding to the other divided areas is controlled to a value with which the brightness of the other divided areas is decreased by a difference between the brightness of the lowest divided area and the set value.

(14) The imaging control method according to (13), in which in the transmittance control step, in a case where a divided area having brightness greater than or equal to a threshold value is present among the other divided areas, the light transmittance of the area corresponding to the divided area is controlled to a value with which the brightness of the divided area is set to the set value.

(15) The imaging control method according to any one of (11) to (14), further comprising an image processing step of generating display image data for display on a display from the second captured image signal obtained by decreasing brightness of the entire second captured image signal by a difference between the brightness of the lowest divided area obtained in the brightness measurement step and the set value, and further, increasing the brightness of the other divided areas of the focusing target area in the second captured image signal to the brightness of the other divided areas obtained in the brightness measurer.

(16) The imaging control method according to any one of (11) to (15), in which imaging control for causing the imager to image the subject in a state where the imaging condition is controlled in the imaging condition control step and the light transmittance is controlled in the transmittance control step is executed at a frequency of once for a plurality of frames.

(17) The imaging control method according to any one of (11) to (16), further comprising a light measurement processing step of measuring brightness of the subject based on the first captured image signal, in which in the imaging condition control step, in a case of controlling the imaging condition to the state, an F number of a stop arranged ahead of the imager is set to the same value as the F number of the stop determined based on the brightness measured in the light measurement processing step.

(18) The imaging control method according to any one of (11) to (16), in which in the imaging condition control step, in a case of controlling the imaging condition to the state, an F number of a stop arranged ahead of the imager is set to the same value as the F number of the stop at a time of imaging for obtaining the first captured image signal.

(19) An imaging control program causing a computer to execute a brightness measurement step of acquiring a first captured image signal obtained from an imager imaging a subject through a focus lens by causing the imager to image the subject, and obtaining brightness of each divided area of a focusing target area set in the first captured image signal, an imaging condition control step of, based on a set value of brightness determined depending on the brightness of each divided area, controlling an imaging condition of the imager to a state where brightness of a lowest divided area which is the divided area having the lowest brightness is set to the set value, a transmittance control step of, in an optical element which has variable light transmittance for each of a plurality of areas and is arranged ahead of the imager, decreasing brightness of other divided areas except for the lowest divided area by controlling light transmittance of the areas corresponding to the other divided areas, and a focusing control step of performing focusing control for the focus lens based on the focusing target area of a second captured image signal obtained from the imager by causing the imager to image the subject in a state where the imaging condition is controlled in the imaging condition control step and the light transmittance is controlled in the transmittance control step.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. Various constituents in the embodiment may be combined in any manner without departing from the gist of the invention.

The present application is based on Japanese Patent Application (JP2018-057244) filed on Mar. 23, 2018, the content of which is incorporated in the present application by reference.

According to the present invention, an imaging control device, an imaging apparatus, an imaging control method, and an imaging control program capable of improving focusing accuracy can be provided.

EXPLANATION OF REFERENCES

100: digital camera
40A: lens device
1: imaging lens
2: stop
4: lens control unit
8: lens drive unit
9: stop drive unit
40B: main body unit
3: variable ND filter
3A: ND drive unit
30: block
af1, af2, af3: area
5: imager
5A: imager drive unit
50: captured image signal
50A: block
AF1, AF2, AF3: divided area
11: system control unit
11A: brightness measurer
11B: imaging condition controller
11C: transmittance controller
11D: focusing controller
11E: light measurement processor
D1: correction amount
14: operation unit
15: memory control unit
16: memory
17: digital signal processing unit
20: external memory control unit
21: storage medium
22: display
24: control bus
25: data bus
200: smartphone
201: casing
202: display panel
203: operation panel
204: display and input unit
205: speaker
206: microphone
207: operation unit
208: camera unit
210: wireless communication unit
211: call unit
212: storage unit
213: external input-output unit
214: GPS reception unit
215: motion sensor unit
216: power supply unit
217: internal storage unit
218: external storage unit
220: main control unit
ST1 to STn: GPS satellite

What is claimed is:

1. An imaging control device comprising:
one or more processors configured to:
acquire a first captured image signal obtained from an imager imaging a subject through a focus lens, by causing the imager to image the subject, and obtain brightness of each of divided areas of a focusing target area set in the first captured image signal;
based on a set value of brightness determined depending on the brightness of each of divided areas, control an imaging condition of the imager to a state where brightness of a lowest divided area which is one of the divided areas having lowest brightness is set to the set value;
in an optical element which has variable light transmittance for each of a plurality of areas and is arranged ahead of the imager, decrease brightness of other divided areas than the lowest divided area by controlling light transmittance of the areas corresponding to the other divided areas; and
perform focusing control for the focus lens based on the focusing target area of a second captured image signal obtained from the imager by causing the imager to image the subject.

2. The imaging control device according to claim 1, wherein the one or more processors control the light transmittance of the areas corresponding to the other divided areas to a value with which the brightness of the other divided areas is set to the set value.

3. The imaging control device according to claim 1, wherein the one or more processors control the light transmittance of the areas corresponding to the other divided areas to a value with which the brightness of the other divided areas is decreased by a difference between the brightness of the lowest divided area and the set value.

4. The imaging control device according to claim 3,
wherein in a case where a first divided area having brightness greater than or equal to a threshold value is present among the other divided areas, the one or more processors control the light transmittance of the area corresponding to the first divided area to a value with which the brightness of the first divided area is set to the set value.

5. The imaging control device according to claim 1, wherein
the one or more processors further generate display image data for being displayed on a display from the second captured image signal obtained by decreasing brightness of entire of the second captured image signal by a difference between the obtained brightness of the lowest divided area and the set value, and further, increase the brightness of the other divided areas of the focusing target area in the second captured image signal to the brightness of the other divided areas.

6. The imaging control device according to claim 1,
wherein imaging control for causing the imager to image the subject in a state where the imaging condition and the light transmittance are controlled by the one or more processors is executed at a frequency of once for a plurality of frames.

7. The imaging control device according to claim 1, further comprising:
the one or more processors measure brightness of the subject based on the first captured image signal,
wherein in a case of controlling the imaging condition to the state, the one or more processors set an F number of a stop arranged ahead of the imager to a same value as an F number of the stop determined based on the measured brightness.

8. The imaging control device according to claim 1,
wherein in a case of controlling the imaging condition to the state, the one or more processors set an F number of a stop arranged ahead of the imager to a same value as an F number of the stop at a time of imaging for obtaining the first captured image signal.

9. An imaging apparatus comprising:
the imaging control device according to claim 1; and
the imager.

10. The imaging apparatus according to claim 9, further comprising:
the optical element.

11. An imaging control method comprising:
acquiring a first captured image signal obtained from an imager imaging a subject through a focus lens, by causing the imager to image the subject, and obtaining brightness of each of divided areas of a focusing target area set in the first captured image signal;
based on a set value of brightness determined depending on the brightness of each of divided areas, controlling an imaging condition of the imager to a state where brightness of a lowest divided area which is one of the divided areas having the lowest brightness is set to the set value;
in an optical element which has variable light transmittance for each of a plurality of areas and is arranged ahead of the imager, decreasing brightness of other divided areas than the lowest divided area by controlling light transmittance of the areas corresponding to the other divided areas; and
performing focusing control for the focus lens based on the focusing target area of a second captured image signal obtained from the imager by causing the imager to image the subject in a state where the imaging condition and the light transmittance are controlled.

12. The imaging control method according to claim 11,
wherein the light transmittance of the areas corresponding to the other divided areas is controlled to a value with which the brightness of the other divided areas is set to the set value.

13. The imaging control method according to claim 11,
wherein the light transmittance of the areas corresponding to the other divided areas is controlled to a value with which the brightness of the other divided areas is decreased by a difference between the brightness of the lowest divided area and the set value.

14. The imaging control method according to claim 13,
wherein in a case where a first divided area having brightness greater than or equal to a threshold value is present among the other divided areas, the light transmittance of the area corresponding to the first divided area is controlled to a value with which the brightness of the first divided area is set to the set value.

15. The imaging control method according to claim 11, further comprising:
generating display image data for being displayed on a display from the second captured image signal obtained by decreasing brightness of entire of the second captured image signal by a difference between the obtained brightness of the lowest divided area and the set value, and further, increasing the brightness of the other divided areas of the focusing target area in the second captured image signal to the brightness of the other divided areas.

16. The imaging control method according to claim 11,
wherein imaging control for causing the imager to image the subject in a state where the imaging condition and the light transmittance are controlled is executed at a frequency of once for a plurality of frames.

17. The imaging control method according to claim 11, further comprising:
measuring brightness of the subject based on the first captured image signal,
wherein in a case of controlling the imaging condition to the state, an F number of a stop arranged ahead of the imager is set to a same value as an F number of the stop determined based on the measured brightness.

18. The imaging control method according to claim 11,
wherein in a case of controlling the imaging condition to the state, an F number of a stop arranged ahead of the imager is set to a same value as an F number of the stop at a time of imaging for obtaining the first captured image signal.

19. A non-transitory computer readable storage medium storing an imaging control program causing a computer to execute:
acquiring a first captured image signal obtained from an imager imaging a subject through a focus lens, by causing the imager to image the subject, and obtaining brightness of each of divided areas of a focusing target area set in the first captured image signal;
based on a set value of brightness determined depending on the brightness of each of divided areas, controlling an imaging condition of the imager to a state where brightness of a lowest divided area which is one of the divided areas having the lowest brightness is set to the set value;
in an optical element which has variable light transmittance for each of a plurality of areas and is arranged ahead of the imager, decreasing brightness of other divided areas than the lowest divided area by controlling light transmittance of the areas corresponding to the other divided areas; and performing focusing control for the focus lens based on the focusing target area of a second captured image signal obtained from the imager by causing the imager to image the subject in a state where the imaging condition and the light transmittance are controlled.

\* \* \* \* \*